W. P. BARTON.
STEERING WHEEL HEATER FOR ROAD VEHICLES.
APPLICATION FILED MAY 5, 1914.
1,117,473.
Patented Nov. 17, 1914.
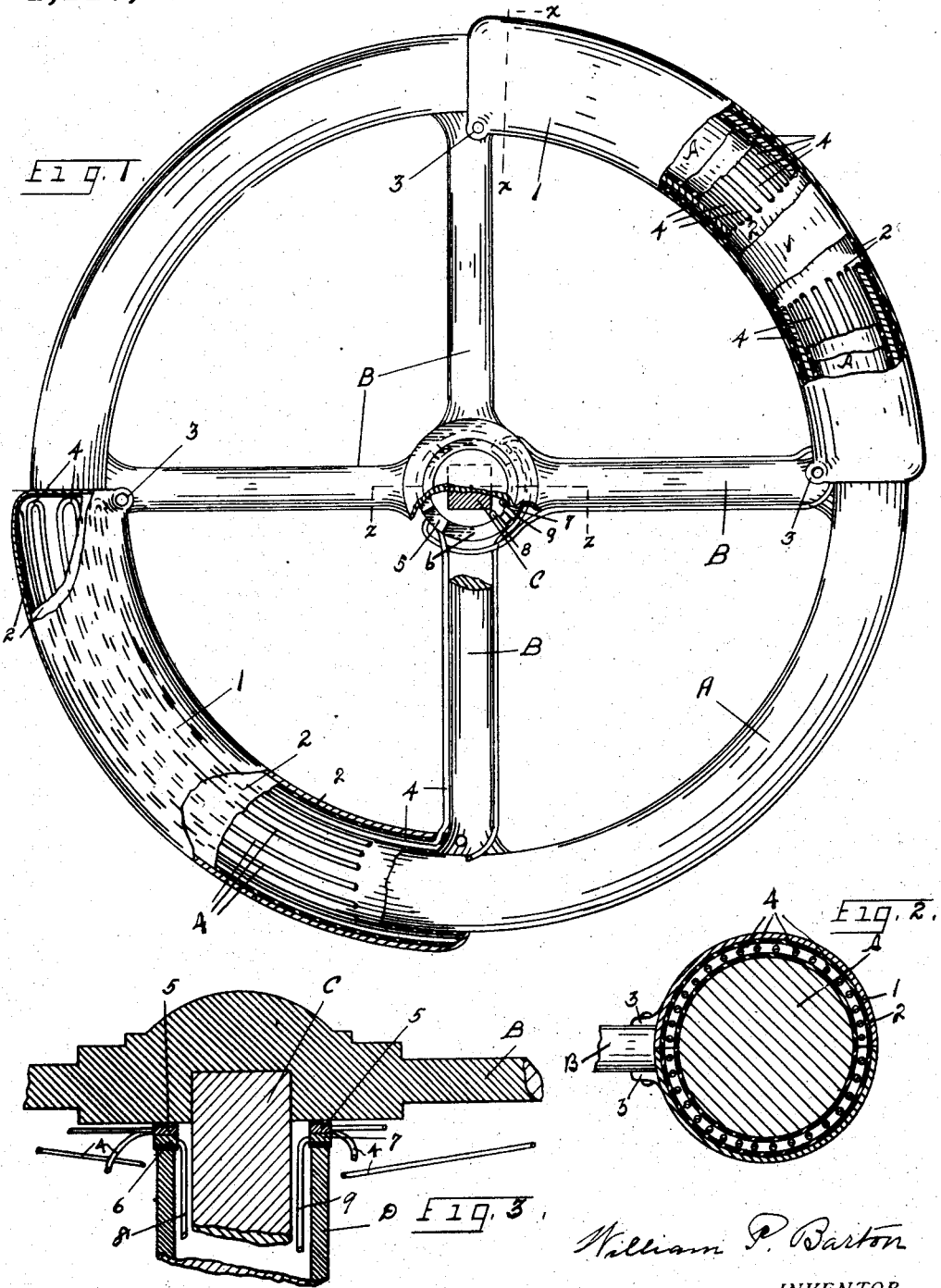
WITNESSES:
William P. Barton
INVENTOR.
BY J. M. Thomas
ATTORNEY.

UNITED STATES PATENT OFFICE.

WILLIAM P. BARTON, OF IDAHO FALLS, IDAHO.

STEERING-WHEEL HEATER FOR ROAD-VEHICLES.

1,117,473.  Specification of Letters Patent.  Patented Nov. 17, 1914.

Application filed May 5, 1914. Serial No. 836,549.

*To all whom it may concern:*

Be it known that I, WILLIAM P. BARTON, a citizen of the United States, residing at Idaho Falls, in the county of Bonneville and State of Idaho, have invented certain new and useful Improvements in Steering-Wheel Heaters for Road-Vehicles, of which the following is a specification.

My invention relates to heating elements on road vehicles and has for its object to provide an attachment that may be secured on the steering hand-wheel of automobiles and other road vehicles now in use, or that may be similarly constructed to warm the hands and provide greater comfort for the driver of such vehicles. These objects I accomplish with the device illustrated in the accompanying drawings in which similar letters and numerals of reference indicate like parts throughout the several figures and as described in the specification forming a part of this application and pointed out in the appended claim.

In the drawings in which I have shown a substantial embodiment of my invention, Figure 1 is a plan view of an automobile steering wheel with two of my devices in place thereon, parts cut away and parts shown in section. Fig. 2 is a vertical section on the radial line $x$ $x$ of Fig. 1. Fig. 3 is an enlarged vertical section on line $y$ $y$ of Fig. 1, to show the contacts and electrical connection.

In driving automobiles and other road vehicles during extremely cold weather the driver frequently suffers from cold, especially in his hands, and it is the purpose of my invention to provide an attachment, which may be fastened on the ordinary steering wheel, and which may be heated by electric current, without impairing the usefulness of the wheel or detracting from its appearance.

With these objects in view the invention consists in the novel construction and arrangement of the parts, to be hereinafter described and claimed.

I have shown the ordinary steering wheel A made of metal, except the rim which is made of wood, and provided with radial spokes B. Said wheel is mounted on the upper end of a steering bar C, which is rotated within the casing D and spaced therefrom. My device consists of two trough-like segment members 1, which are semi-circular in cross section and curved to fit around and inclose, when fastened together, a portion of the rim of said wheel A. Each of said segment members 1 is provided with an insulating lining 2, and has perforated radially extended lugs 3 on their inner corners. Holes are bored through the said spokes B of the wheel in alinement with the perforations in said lugs 3 through which bolts are inserted to fasten the device together and on the rim of said wheel. A high resistance wire 4 is longitudinally disposed within said segment members and curved and bent upon itself to form a trough-like heat element conforming to the general shape of said segment members 1. The leads of said wire 4 are spaced apart and insulated to prevent short circuiting, and the ends of the wire extend without said segment members 1 at one of their ends and are carried on the spokes B to contact members 5, which are fastened to the hub of said wheel A but insulated therefrom. Segment shaped contact members 6 and 7 are secured on the upper end of said casing D and insulated therefrom and from each other, but are in frictional contact with said contact members 5. Wires 8 and 9 are connected with said segment contact members 6 and 7 respectively and are carried down within said casing D to a source of electric energy mounted on the vehicle, not shown. Preferably each pair of the casing members 1 will cover one quarter of the rim of said wheel and two pair diametrically opposed will supply with their heater lining all the warmth required.

Having thus described my invention I desire to secure by Letters Patent and claim:—

In a device of the class described the combination with the steering wheel of road vehicles; of a pair of segment shaped trough-like members spaced from said wheel; opposed perforated radially extended lugs thereon; suitably insulated resistance wires longitudinally disposed in folds as a filler in the space between said wheel and the inside of said trough-like members; contact members insulated from and fastened to the hub of said steering wheel and connected with said resistance wires; and subjacent segment contact members insulated from and fastened on the upper portion of the casing of the steering rod on which said steering wheel is mounted.

In testimony whereof I have affixed my signature in presence of two witnesses.

WILLIAM P. BARTON.

Witnesses:
SAM RANEY,
W. W. BARTON.

Copies of this patent may be obtained for five cents each, by addressing the "Commissioner of Patents, Washington, D. C."